United States Patent
Pepper et al.

(10) Patent No.: US 10,579,300 B2
(45) Date of Patent: Mar. 3, 2020

(54) INFORMATION HANDLING SYSTEM FIRMWARE PERSISTENT MEMORY RUNTIME RECLAIM

(71) Applicant: Dell Products L.P., Round Rock, TX (US)

(72) Inventors: Chris E. Pepper, Leander, TX (US); Justin W. Johnson, Austin, TX (US); Allen C. Wynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/912,815

(22) Filed: Mar. 6, 2018

(65) Prior Publication Data
US 2019/0278508 A1    Sep. 12, 2019

(51) Int. Cl.
G06F 3/06 (2006.01)
G06F 9/4401 (2018.01)

(52) U.S. Cl.
CPC ............ *G06F 3/0652* (2013.01); *G06F 3/064* (2013.01); *G06F 9/4406* (2013.01); *G06F 2212/202* (2013.01)

(58) Field of Classification Search
None
See application file for complete search history.

(56) References Cited

U.S. PATENT DOCUMENTS

| 9,971,683 B1 * | 5/2018 | Bell ..................... G06F 12/0253 |
| 2015/0154108 A1 * | 6/2015 | Gorobets ............ G06F 12/0246 711/103 |

OTHER PUBLICATIONS

Jiewen Yao et al., Intel, A Tour Beyond BIOS Implementing UEFI Authenticated Variables in SMM with EDKII, White Paper, Sep. 2014, 28 pages, https://firmware.intel.com/sites/default/files/resources/A_Tour_Beyond_BIOS_Implementing_UEFI_Authenticated_Variables_in_SMM_with_EDKII.pdf.

* cited by examiner

*Primary Examiner* — Kevin Verbrugge
(74) *Attorney, Agent, or Firm* — Zagorin Cave LLP; Robert W. Holland

(57) ABSTRACT

Information handling system non-volatile random access memory (NVRAM) that stores operating system variables is managed to prevent a memory full condition by erasing selected portions of the NVRAM during operating system state transitions. If a first bank of NVRAM reaches a memory full condition threshold, active variables are copied to a second back of NVRAM and at least a portion of the first bank of NVRAM is erased during an operating system state transition from an on state to a reduced power and/or off state.

6 Claims, 4 Drawing Sheets

INFORMATION HANDLING SYSTEM FIRMWARE PERSISTENT MEMORY RUNTIME RECLAIM

BACKGROUND OF THE INVENTION

Field of the Invention

The present invention relates in general to the field of information handling system firmware persistent memory management, and more particularly to an information handling system firmware persistent memory runtime reclaim.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a variety of hardware components that cooperate to process information. Generally, an operating system executes on a central processing unit (CPU) of the information handling system to manage interactions of the hardware components. For example, the WINDOWS and LINUX operating systems include application programming interfaces (APIs) that define parameters for applications running on a CPU to access information and functions of physical components. For instance, a word processing application running on a CPU accesses interfaces of an operating system to present a keyboard user interface that accepts keyed inputs from a keyboard device. Typically, information handling systems bootstrap or "boot" an operating system at power up before applications run on the CPU.

During boot, embedded code stored in persistent flash memory, such as non-volatile random access memory (NVRAM), defines operating system parameters that initiate execution of the operating system on the CPU. For example, an embedded controller powers up in response to a GPIO interrupt from a power switch and executes pre-boot code that feeds the CPU instructions and memory locations to retrieve the operating system. The CPU executes the pre-boot code, sometimes referred to by the PC-compatible term as the Basic Input/Output System (BIOS), to retrieve and execute operating system code that boots the operating system from an off state to an on state that supports execution of applications. Pre-boot code generally falls within the Unified Extensible Firmware Interface (UEFI) standard that defines a software interface between the operating system and firmware of an information handling system. UEFI and Secure Boot embedded code often store variables in NVRAM so that the variables are available during system boot from a power off state.

A number of difficulties are associated with the use of NVRAM and other persistent storage devices generally known as non-volatile memory. One difficulty is that NVRAM has a limited number of writes that it can support before the memory life begins to fail, usually around one hundred thousand writes. Another difficulty is that NVRAM typically has to be erased before it is written and the erase time tends to be slow, such as 400 msec for a 4 KB memory size. Due to these limitations, information handling systems tend to limit the number of writes made to NVRAM and to schedule the writes during time periods in which a delay will have less impact on the user experience. Thus, operating systems typically update variables stored in NVRAM by marking the existing variable as deleted without actually performing an erase, and writing the updated variable to a new location in the NVRAM. By avoiding an erase cycle, the variable update avoids any substantial delay. Instead, NVRAM erases are performed during system POST so that after boot adequate NVRAM storage is available to the operating system during operations to support variable updates.

In some instances, an operating system that repeatedly writes variables to NVRAM can fill available NVRAM with writes of updated and new variables before an erase cycle is supported that removes deleted values. If no NVRAM space is available to accept a new or updated variable write, the operating system write will fail and introduce an error. In some instances, failure to write an operating system variable to NVRAM will cause a fatal failure in the information handling system resulting in it becoming unresponsive and unrecoverable through normal means. In other instances failures may result in deployed or remote system failures. For example, if an information technology department encounters an NVRAM-full error while deploying systems, other management systems may fail to configure and provision the information handling system, such as for UEFI firmware settings that are also stored in NVRAM independent of the operating system.

SUMMARY OF THE INVENTION

Therefore, a need has arisen for a system and method which reclaims firmware persistent memory to manage a memory full condition during runtime.

In accordance with the present invention, a system and method are provided which substantially reduce the disadvantages and problems associated with previous methods and systems for managing information handling system NVRAM that stores operating system variables. NVRAM garbage collection copies NVRAM variables from an active NVRAM memory block to a spare memory block when a memory full condition is detected. The spare NVRAM block is then made the active block and reclaim of NVRAM is scheduled for operating system power state transitions.

More specifically, an information handling system processes information on a central processing unit under the management of an operating system. The operating system boots from an off to an operational state by reference to variables stored in persistent non-volatile memory, such as non-volatile random access memory. During runtime, new and updated variables are written to clean NVRAM memory locations in a first block of NVRAM and deleted or inactive variables in the first block are left in place without performing an erase. If a memory full condition is detected in association with the first block, active variables in the first block of NVRAM are copied to a second block of the NVRAM and pointed to as the active variables. Once the second block of NVRAM is identified as the active variables, the first block of NVRAM is scheduled for erasure in whole or in part at subsequent operating system state transitions, such as a transition from an on state to a reduced power state. In one embodiment, if the second block of NVRAM reaches a memory full condition, the information handling system transition into and out of the reduced power state to force NVRAM erasure that makes memory space available in the first block of NVRAM.

The present invention provides a number of important technical advantages. One example of an important technical advantage is that an information handling system NVRAM that stores operating system variables is monitored to detect that available memory has reached a threshold so that a runtime operating system NVRAM reclaim process frees additional NVRAM space. Operating system variables are moved to a spare memory block that is activated with space remaining in memory to store updated and new variables. Once the spare memory block is activated, memory blocks having deleted variables are flagged for an erase operation that takes place when end user disruption is unlikely, such as transition to and from sleep states or during system idle times. Targeted small scale erase operations clean NVRAM to prepare additional memory for subsequent writes, thus ensuring that adequate NVRAM remains available to avoid a memory full condition that causes system failure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system NVRAM is managed with selective erases during operating system state transitions from an on state to a reduced power state, such as ACPI S3, S4 or S5 state. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
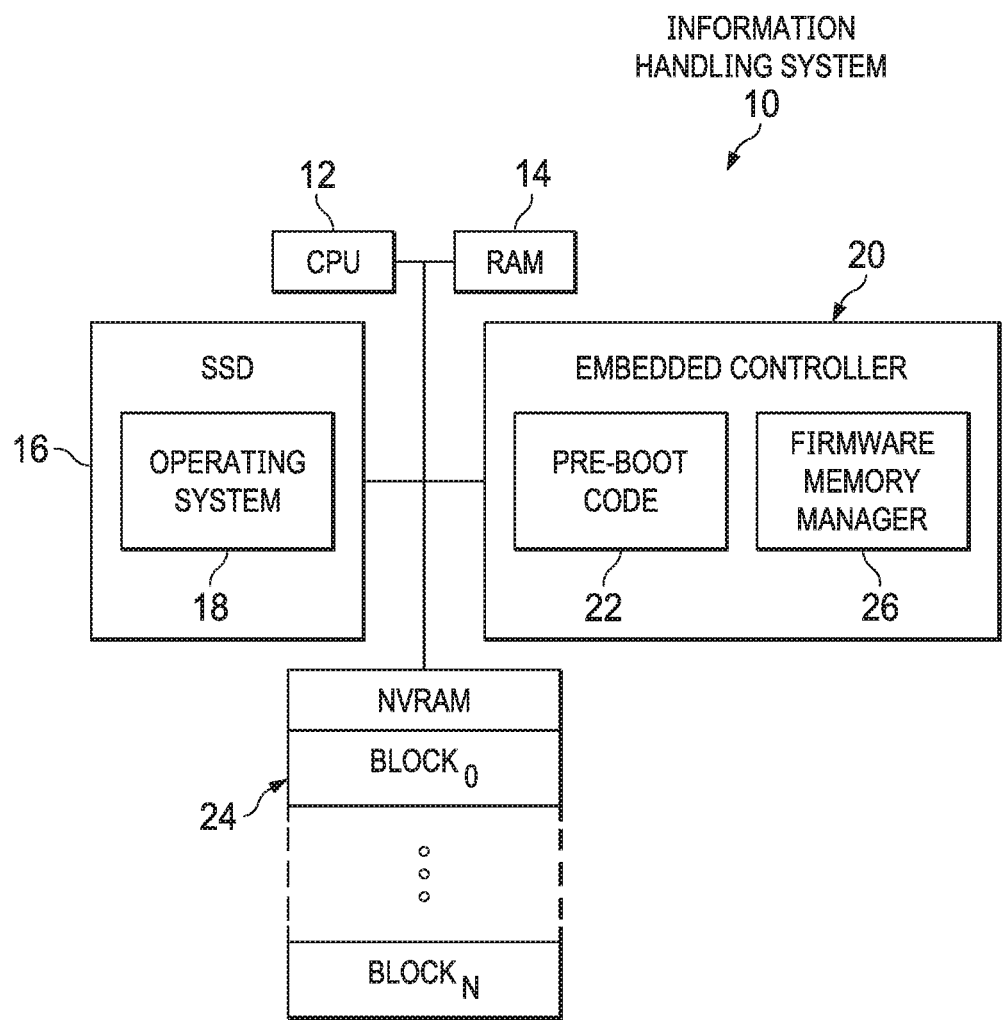
FIG. 1 depicts a block diagram of an information handling system configured to manage NVRAM with selective erases during operating system state transitions.

Referring now to FIG. 1, a block diagram depicts an information handling system 10 configured to manage NVRAM 24 with selective erases during operating system 18 state transitions. In the example embodiment, information handling system 10 processes information with a central processing unit (CPU) 12 that executes instructions, such as operating system and/or application instructions. A random access memory (RAM) 14 interfaces with CPU 12 to store the instructions and information. A persistent storage device, such as a solid state drive (SSD) 16, stores instructions and information during power down states. For instance, operating system 18 is stored in SSD 16 during power down of CPU 12 and retrieved through a boot process to RAM 14 for execution by CPU 12 at power up. An embedded controller 20 manages physical interactions at information handling system 10, such as power up and interactions with input/output (I/O) devices like a keyboard and mouse. For instance, a press of a power button at information handling system 10 during a power down state sends an interrupt to a GPIO of embedded controller 20 that initiates pre-boot code 22 to execute on CPU 12. Pre-boot code 22 is typically referred to as the BIOS and, for instance, executes in compliance with the UEFI standard to boot operating system 18. Typical pre-boot code 22 retrieves operating system 18 to RAM 14 for execution by CPU 12 with operating system variables stored in NVRAM 24. Storing operating system variables in NVRAM 24 provides access to operating system settings before and during boot so that operating system 18 boots to a correct operational setting.

A firmware memory manager 26 cooperates with operating system 18 to manage storage of variables in NVRAM 24. In the example embodiment, firmware memory manager 26 is embedded code instructions stored persistent memory and executed on embedded controller 20 that tracks and manages NVRAM usage. In alternative embodiments, firmware memory manager 26 includes software components distributed to execute at various hardware components, such as CPU 12. Firmware memory manager 26 supports NVRAM reclaim during operating system runtime to help prevent an NVRAM-full condition in which operating system variables cannot store into NVRAM 24. In the example embodiment, firmware memory manager 26 divides NVRAM 24 into first and second memory blocks and selects a memory block to store operating system variables. As new or updated operating system variables are stored to NVRAM 24, firmware memory manager tracks the number of variable writes to the selected block of NVRAM 24 and delays erases of deleted variables so that the time consuming erase process does not take place while the operating system in executing in an on state. When the number of operating system variable writes reaches a threshold, such as approaching or reaching the end of the selected block of NVRAM 24, firmware memory manager 26 initiates an operating system runtime reclaim process that copies active variables from the selected block of NVRAM 24 to the second block of NVRAM 24 and then points operating system 18 to the second block of NVRAM 24 for use at runtime. In one example embodiment, active variables are the variables that have not been marked as deleted in the first block of NVRAM 24 so that the copy of variables to the second block of NVRAM 24 does not include deleted variables. The process of copying active variables has minimal impact on runtime operating system performance since writing to previously-erased NVRAM 24 takes very little time and since erasing of the deleted variables for the first block of NVRAM 24 is delayed.

After firmware memory manager 26 copies active variables to the second block of NVRAM 24, operating system 18 reads and writes new and updated variables at the second block of NVRAM 24 and marks the second block of NVRAM 24 for erasure at an operating system state transition, such as a transition from an on state to a reduced power state, such as ACPI S3 sleep or S4/S5 off states. For example, firmware memory manager 26 schedules an erase of all or part of the first block of NVRAM 24 at transition from the on state to a reduced power state so that the erasing of the non-active first block of NVRAM 24. In one example embodiment, a transition from on to an off state initiates an erase of the entire first block of NVRAM 24, which can take 12.8 seconds for a typical 128 KB NVRAM size, while transition from on to a sleep state initiates an erasure of a portion of the first block of NVRAM 24, such as in 4 KB portions that take 400 msec for a typical NVRAM. As NVRAM 24 erases, firmware memory manager 26 marks the erased portions of memory as available to use for subsequent writes. For example, at shutdown and restart of information handling system 10, system POST may rapidly establish a fresh block of NVRAM 24 by writing active variables to the erased block and scheduling the other block for erasure when impact on performance will be minimal, such as at transition to sleep or off states. In one embodiment, if NVRAM 24 runs low on room to store new and update variables while an erase of unused space is scheduled, firmware memory manager 26 initiates a transition to and from a sleep or off state so that scheduled erases are performed. By forcing the reduced power state, such as with a warning to an end user, firmware memory manager 26 protects operational features of information handling system 10 that are managed through ACPI state transitions, such as network communications. Although the example embodiment depicts first and second memory blocks of NVRAM 24, in alternative embodiments, memory pointers managed by firmware memory manager 26 may use multiple blocks of smaller memory portions instead so that only portions with deleted variables will have to be relocated in memory low conditions.

Figure 2:
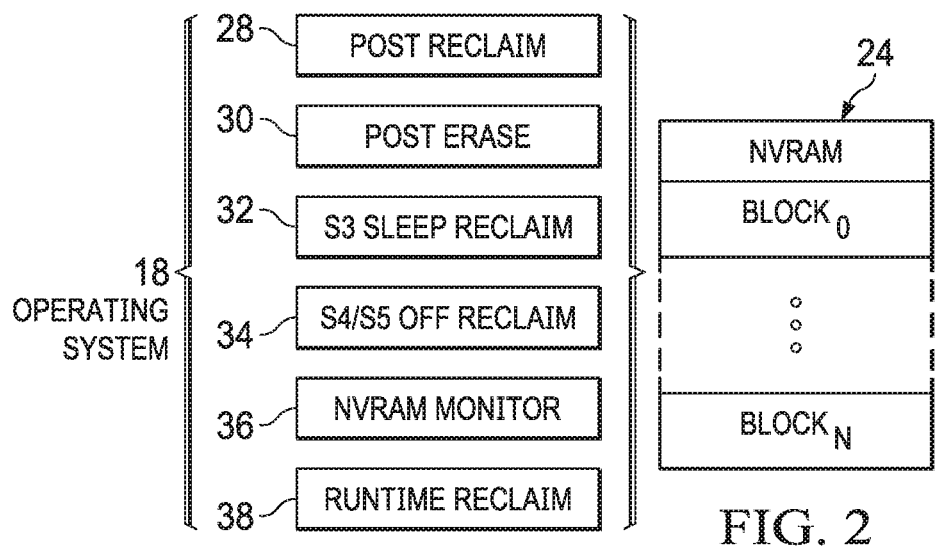
FIG. 2 depicts a functional block diagram of a system for managing NVRAM storage of operating system variables.

Referring now to FIG. 2, a functional block diagram depicts a system for managing NVRAM 24 storage of operating system variables. For example, the modules 28-38 depicted by FIG. 2 are firmware components that execute on embedded controller 20 and/or software components distributed at various processing resources interfaced with NVRAM 24. A post reclaim module 28 and POST erase module 30 cooperate to execute at power on system test (POST) of information handling system 10 to ensure that NVRAM 24 has adequate storage available to manage operating system variables. For instance, after or during POST, POST erase module 30 erases deleted variables from NVRAM 24 so that the memory locations of the deleted variables is available to write new or updated variables. In one example embodiment, POST reclaim module 28 copies active variables to RAM 14 so that POST erase module 30 erases used portions of NVRAM 24 and then POST reclaim module 28 copies the active variables back to NVRAM 24, thus allowing system start to have the maximum amount of NVRAM 24 memory available.

S3 Sleep Reclaim module 32 executes at transition from an on state to a sleep state, such as an ACPI S3 sleep state, to erase at least a portion of NVRAM 24 so that the portion is available to store values on system wake. S3 Sleep Reclaim module 32 initiates at a transition to an S3 or other sleep state to erase a portion of NVRAM 24 defined in a schedule. The size of the erased portion depends upon the acceptable delay for the information handling system transition to sleep, which will increase approximately 400 msec for each 4 KB of memory erased. In contrast, S4/S5 Off Reclaim module 34 erases larger portions or a complete block of NVRAM 24 when information handling system 10 transitions from an on or a sleep state to the off state. For instance, end users typically experience less need for a rapid shutdown to an off mode so that additional time for erasing NVRAM 24 does not impact the user experience. However, once NVRAM 24 is erased, more rapid POSTs become possible where updated variables can be written to the erased portions of NVRAM 24.

NVRAM monitor 36 monitors writes to NVRAM 24 to detect a memory full condition and track portions of NVRAM 24 that are erased and prepared to accept new writes. A runtime reclaim module 38 initiates at a memory full condition detected by NVRAM monitor 38 to transfer active NVRAM values for a memory block currently in use to a new memory block of NVRAM 24. As an example, at POST NVRAM monitor 36 receives a memory size remaining in a block to which operating system values may be written at runtime. As values are written to the active block of NVRAM 24, the size of available memory decreases and the number of deleted values that remain stored in NVRAM 24 increases. Once NVRAM 24 comes within a predetermined number of writes of a full memory condition, runtime reclaim module 38 copies all active values of the active block of NVRAM 24 to a spare block while leaving deleted values uncopied. The active variables are, for instance, variables not marked deleted, although in alternative embodiments non-deleted but otherwise outdated variables may be selected as not active. After the active variables are copied to the spare block, runtime reclaims module 38 points to the spare block of NVRAM 24 as the active block and schedules the previously active block of NVRAM 24 to be deleted.

Figure 3:
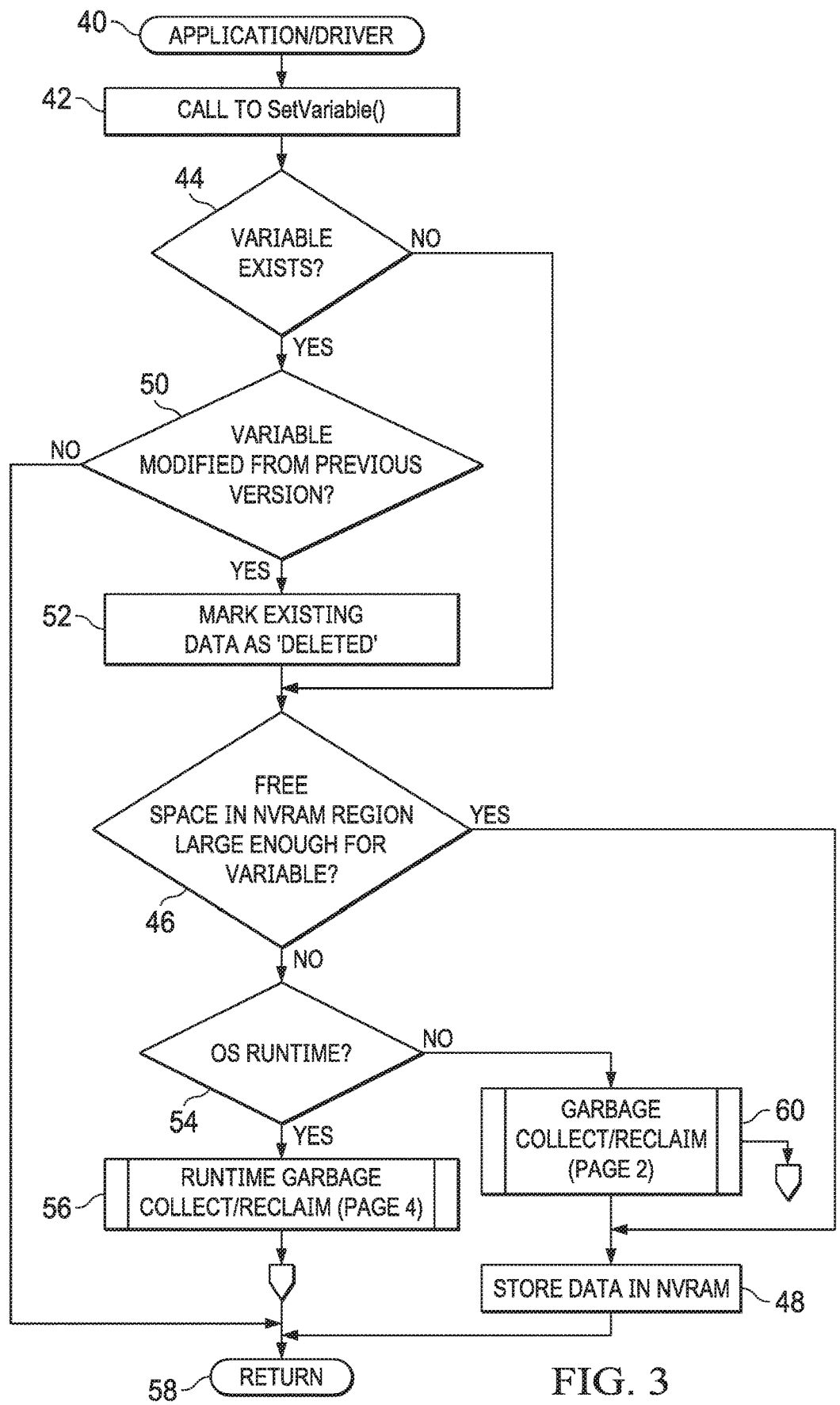
FIG. 3 depicts a flow diagram of a process for setting a variable to NVRAM with runtime reclaim.

Referring now to FIG. 3, a flow diagram depicts a process for setting a variable to NVRAM with runtime reclaim. Firmware processes variable storage to NVRAM during operating system runtime by making space through a garbage collection and reclaim without returning a memory error due to a full memory condition. The process starts at step 40 with an application or driver making a call at step 42 to a set variable module that writes a variable value to NVRAM 24, such as an operating system setting value. The process continues to step 44 to determine if the variable already exists in NVRAM and, if not, to determine if enough memory space exists in NVRAM to store the variable. If enough memory space is available, the process continues to step 48 to write the variable in available space of the NVRAM and returns at step 58. As long as adequate space exists, new variables are written to NVRAM in unused space.

If at step 44 a variable already exists in NVRAM, the process continues to step 50 to determine if the variable has a modified value from that already stored in NVRAM. If the value has not changed, the process returns at step 58 without writing to NVRAM. If at step 50 the variable has changed from the value stored in NVRAM, the process continues to step 52 to mark the value stored in NVRAM as deleted to indicate that the value is no longer active. The process then continues to steps 46, 48 and 58 to write the updated value to a different location in NVRAM provided sufficient memory space is available.

If at step 46 a determination is made that the memory space in NVRAM is not sufficient to write the variable, the process continues to step 54 to determine if the operating system is at runtime. If the operating system is not at runtime, then the process continues to step 60 to perform a garbage collection and reclaim of NVRAM to create space for the variable. Generally with the operating system not at runtime, the information handling system is in a BIOS setup mode or other maintenance step so that delays associated NVRAM erase do not cause unexpected performance degradation. If, however, the operating system is at runtime, NVRAM erase will introduce delays and communication issues that will cause unacceptable degradation in performance. For example, if NVRAM is on a Serial Peripheral Interface (SPI) bus, communication on the bus may be shutdown until the erase is complete. In order to prevent such degradation, the process continues to step 56 to perform an operating system runtime garbage collection and reclaim.

Figure 4:
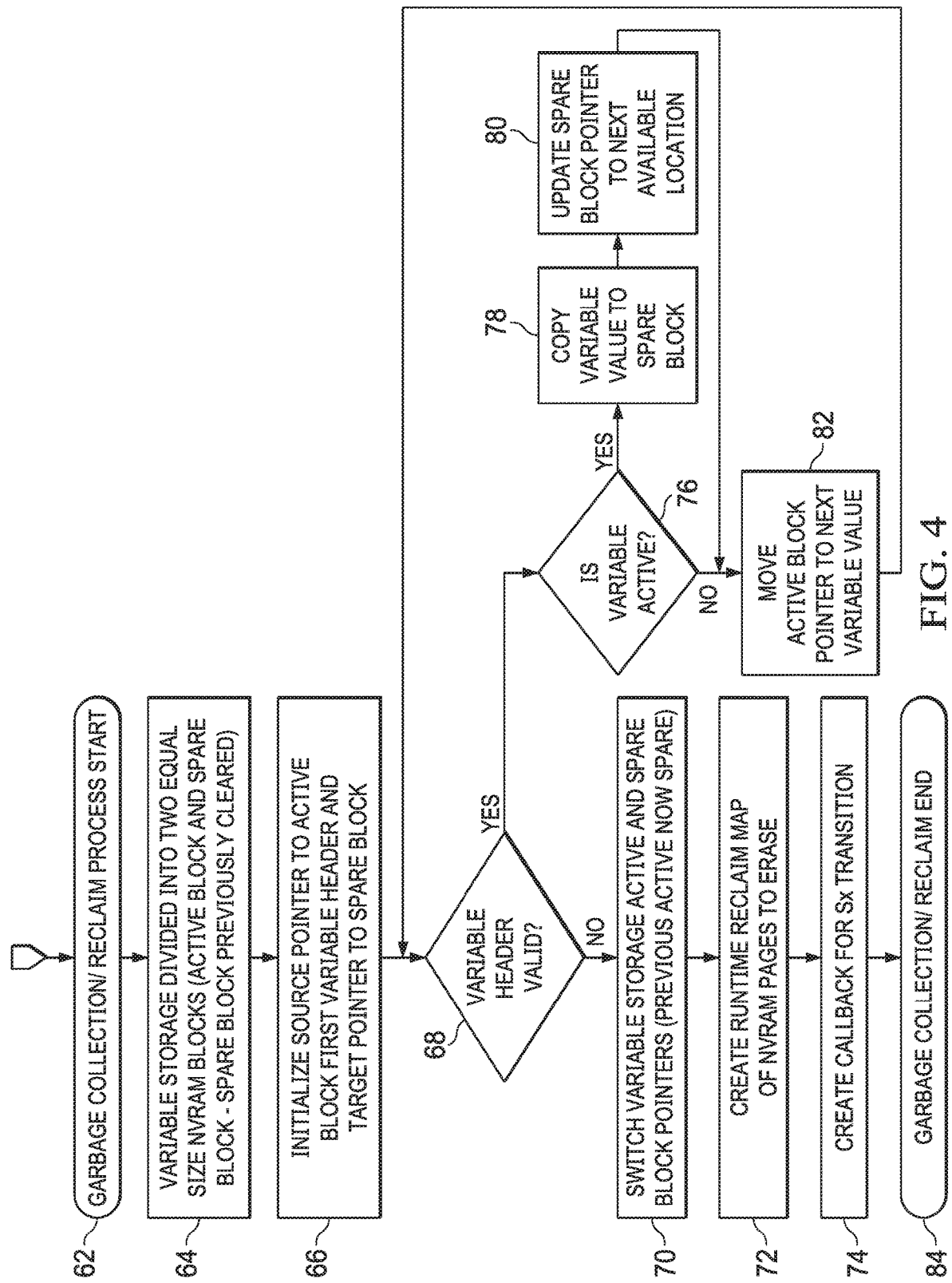
FIG. 4 depicts a flow diagram of a process for runtime reclaim of NVRAM at a memory full condition.

Referring now to FIG. 4, a flow diagram depicts a process for runtime reclaim of NVRAM at a memory full condition. The process starts at step 62 and continues to step 64 to apply variable storage in NVRAM with two equal sized blocks, an active block that stores variables currently in use and a spare block of previously erased NVRAM. At step 66, the source pointer is initialized to the active block of NVRAM first variable header and a target pointer is initialized to the spare block first memory location. At step 68, a determination is made of whether the variable header is valid. If yes, the process continues to step 76 to determine if the variable associated with the header is active or deleted. If the variable is active, the process continues to step 78 to copy the variable value to the next memory position of the spare block. At step 80, the spare block memory pointer is incremented to the next available location and the process continues to step 82 to move the active block memory pointer to its next variable value. If at step 76 the variable is not active, the process continues to step 80 without copying the variable value to the target spare block. From step 82, the process returns to step 68 and continues to increment through the active block until the end of the active block is reached. As a result, active variables are copied to the spare block of memory and deleted or otherwise inactive variables are not copied to the spare block of memory. Once all of the active block of memory variable headers have been processed and an invalid header is reached, the process continues to step 70 to switch the variable storage active and spare block memory pointers so that the spare block becomes the active block and the active block becomes the spare block. At step 72, a runtime reclaim map is generated that defines the NVRAM pages to erase. For example pages of NVRAM may come in 4, 16, 32 or 64 KB sizes that may be erased in a granular or complete manner. In the example embodiment in which the NVRAM is split into two equal sized blocks, the now spare block is mapped to erase as pages or in whole. At step 74, a callback is created so that at an operating sleep transition the map is retrieved to perform the NVRAM erase. At step 84, the process returns with the new active block having space to store new and updated variables that support the operating system.

Figure 5:
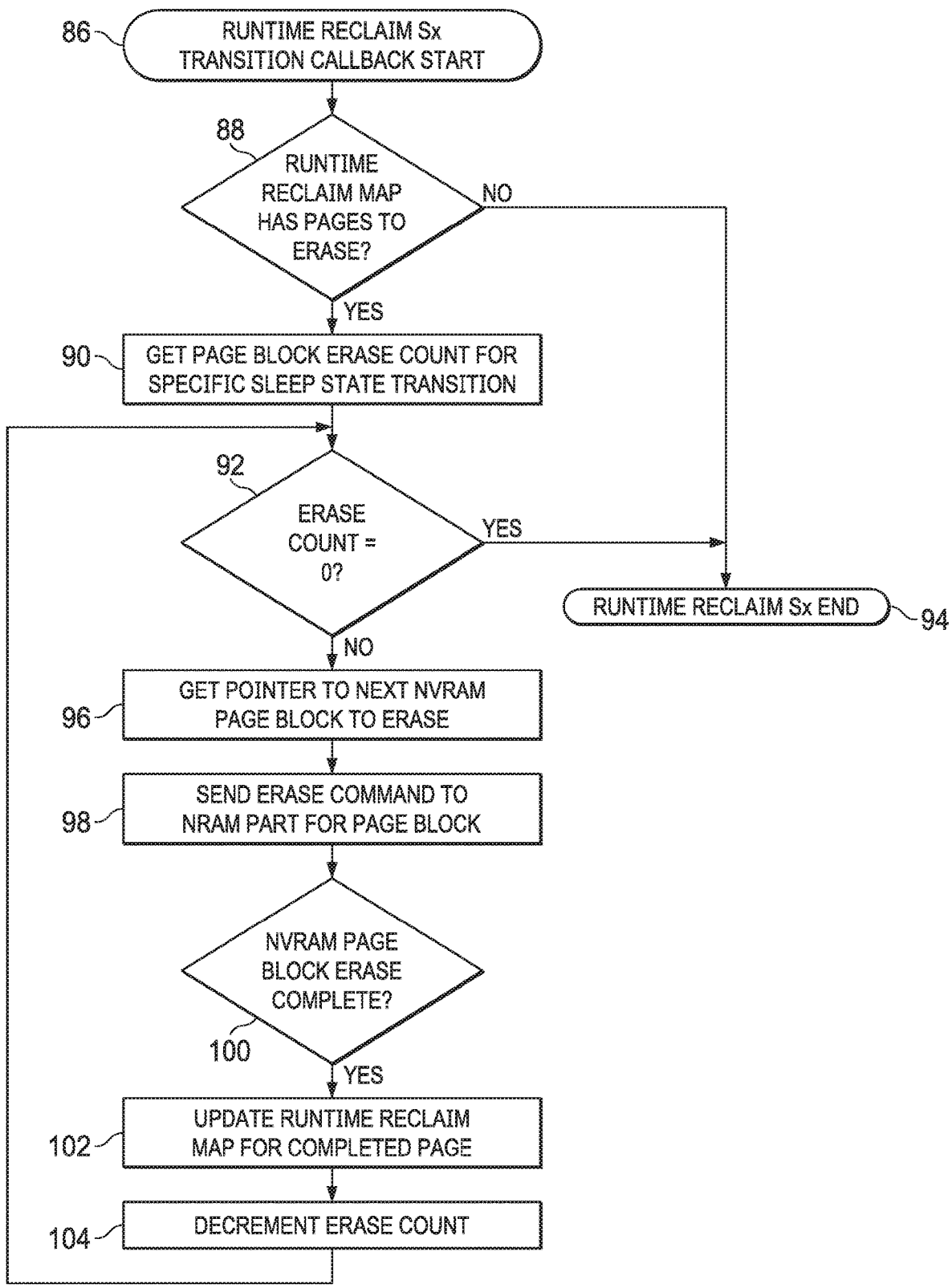
FIG. 5 depicts a flow diagram of a process for NVRAM erase during operating system transitions from an on to a low power state.

Referring now to FIG. 5, a flow diagram depicts a process for NVRAM erase during operating system transitions from an on to a low power state. The process starts at step 86 with execution of the callback upon entry to the operating system state transition. At step 88 a determination is made of whether a runtime reclaim map has pages of memory to erase. If yes, the process continues to step 90 to get the page block erase count for the specific operating system state transition. For example, transition to a sleep state might erase one or a few blocks of NVRAM so that the transition to sleep is not unduly delayed. As another example, transition to an off state might erase all pages that remain to be erased since the delay to an off state can have a greater time than to a sleep state without impacting the end user experience. In various embodiments, different amounts of memory may be erased for different types of information handling system platforms. At step 92 a determination is made of whether the number of pages to erase is zero. If no pages remain to erase, the process ends at step 94.

If at step 92 NVRAM pages remain to erase, the process continues to step 96 to get the pointer to the next NVRAM page block to erase. At step 98 the erase command is sent to the NVRAM for the page block and at step 100 a determination is made that the page block erase is complete, such as by a call back from the NVRAM part. At step 102, the runtime reclaim map is updated to reflect that the NVRAM page erase was completed and at step 104 the erase count is decremented. The process returns to step 92 to determine if additional erases should be performed or the process should end at step 94. At completion of the erases, the reclaim process ends and the operating system transition completes.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information;
   a persistent storage device interfaced with the processor and storing an operating system operable to execute on the processor;
   non-volatile memory interfaced with the processor and accessible by the operating system to read and write values; and
   a memory manager interfaced with the non-volatile memory, the memory manager operable to detect a predetermined memory full threshold during an operating system runtime write to the non-volatile memory and, in response to detecting the predetermined memory full threshold, to move active values from a first block of the non-volatile memory to a second block of the non-volatile memory, to point the operating system to the second block of the non-volatile memory instead of the first block of non-volatile memory, to schedule an erase of the first block of the non-volatile memory in response to an operating system state change, to classify values in the first block of non-volatile memory as inactive if the values are marked as deleted, and to copy only active and not inactive values from the first block of non-volatile memory to the second block of non-volatile memory in response to detecting the memory full threshold;
wherein:
the operating system state change comprises a transition to an S3 sleep state; and
the erase comprises a portion of less than all of the first block of non-volatile memory.

2. An information handling system comprising:
a processor operable to execute instructions that process information;
a memory interfaced with the processor and operable to store the instructions and information;
a persistent storage device interfaced with the processor and storing an operating system operable to execute on the processor;
non-volatile memory interfaced with the processor and accessible by the operating system to read and write values; and
a memory manager interfaced with the non-volatile memory, the memory manager operable to detect a predetermined memory full threshold during an operating system runtime write to the non-volatile memory and, in response to detecting the predetermined memory full threshold, to move active values from a first block of the non-volatile memory to a second block of the non-volatile memory, to point the operating system to the second block of the non-volatile memory instead of the first block of non-volatile memory, to schedule an erase of the first block of the non-volatile memory in response to an operating system state change, to classify values in the first block of non-volatile memory as inactive if the values are marked as deleted, and to copy only active and not inactive values from the first block of non-volatile memory to the second block of non-volatile memory in response to detecting the memory full threshold;
wherein the memory manager is further operable to:
detect a predetermined memory full threshold associated with the second block of non-volatile memory;
in response to the memory full threshold, set the entire first block of non-volatile memory to erase at a sleep state; and
initiate a transition into and out of sleep state.

3. The information handling system of claim 2 wherein the memory manager is further operable to copy active values from the second block of non-volatile memory to the first block of non-volatile memory at transition out of the sleep state.

4. A method for managing non-volatile memory, the method comprising:
detecting a predetermined memory full condition associated with a first block of the non-volatile memory;
in response to the detecting, copying active variables from the first block of the non-volatile memory to a second block of the non-volatile memory; and
setting the first block of the non-volatile memory to erase at a predetermined operating system state transition;
pointing the operating system to the second block of the non-volatile memory instead of the first block of non-volatile memory; and
writing operating system variable updates to the second block of non-volatile memory;
wherein:
the operating system state transition comprises a transition to an S3 power state;
only a portion of the first block of non-volatile memory erases.

5. The method of claim 4 further comprising:
marking the erased portion as available to store variables; and
writing operating system variable updates to the erased portion.

6. A method for managing non-volatile memory, the method comprising:
detecting a predetermined memory full condition associated with a first block of the non-volatile memory;
in response to the detecting, copying active variables from the first block of the non-volatile memory to a second block of the non-volatile memory;
setting the first block of the non-volatile memory to erase at a predetermined operating system state transition;
detecting a predetermined memory full condition associated with the second block of the non-volatile memory;
in response to the detecting, initiating a transition to and from a sleep state; and
erasing at least a portion of the first block of the non-volatile memory during the sleep state.

\* \* \* \* \*